US010572533B2

(12) United States Patent
Coburn, IV

(10) Patent No.: US 10,572,533 B2
(45) Date of Patent: Feb. 25, 2020

(54) RESOLVING INCONSISTENT QUEUES

(71) Applicant: Sonos, Inc., Santa Barbara, CA (US)

(72) Inventor: Arthur L. Coburn, IV, Lexington, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 15/898,855

(22) Filed: Feb. 19, 2018

(65) Prior Publication Data

US 2018/0349390 A1 Dec. 6, 2018

Related U.S. Application Data

(63) Continuation of application No. 15/227,148, filed on Aug. 3, 2016, now Pat. No. 9,898,532, which is a (Continued)

(51) Int. Cl.
*H04N 21/436* (2011.01)
*H04N 21/458* (2011.01)
(Continued)

(52) U.S. Cl.
CPC .............. *G06F 16/60* (2019.01); *G06F 12/00* (2013.01); *G06F 15/16* (2013.01); *H04L 65/60* (2013.01);
(Continued)

(58) Field of Classification Search
CPC ...... G06F 12/00; G06F 15/16; G06F 17/3074; H04L 65/60; H04N 21/43615; H04N 21/4583; H04N 21/4825; H04N 21/8113
(Continued)

(56) References Cited

U.S. PATENT DOCUMENTS 5,406,634 A 4/1995 Anderson et al.
5,440,644 A 8/1995 Farinelli et al.
(Continued)

FOREIGN PATENT DOCUMENTS

EP 1389853 A1 2/2004
KR 20090017795 2/2009
(Continued)

OTHER PUBLICATIONS

AudioTron Quick Start Guide, Version 1.0, Mar. 2001, 24 pages.
(Continued)

*Primary Examiner* — Hemant S Patel
(74) *Attorney, Agent, or Firm* — McDonnell Boehnen Hulbert & Berghoff LLP

(57) ABSTRACT

Embodiments described herein may involve inconsistent queues. An example implementation may involve a computing device receiving a message indicating a playback queue corresponding to a playback zone of a media playback system. The playback queue may include first media items queued in a first order for playback by the playback zone. The computing device determines that a playlist at the computing device is to be queued for playback in the playback queue corresponding to the playback zone, the playlist including second media items in a second order. The computing device determines that the first media items in the first order is different from the second media items in the second order, and based on the determination, causes the first media items in the playback queue to be replaced with the second media items in the playlist.

20 Claims, 7 Drawing Sheets

Related U.S. Application Data continuation of application No. 14/330,694, filed on Jul. 14, 2014, now Pat. No. 9,485,545.

(51) Int. Cl.
*H04N 21/482* (2011.01)
*H04N 21/81* (2011.01)
*G06F 12/00* (2006.01)
*G06F 15/16* (2006.01)
*G06F 16/60* (2019.01)
*H04L 29/06* (2006.01)

(52) U.S. Cl.
CPC ... *H04N 21/43615* (2013.01); *H04N 21/4583* (2013.01); *H04N 21/4825* (2013.01); *H04N 21/8113* (2013.01)

(58) Field of Classification Search
USPC .............................................................. 700/94
See application file for complete search history.

(56) References Cited

U.S. PATENT DOCUMENTS

| | | | |
|---|---|---|---|
| 5,761,320 A | 6/1998 | Farinelli et al. |
| 5,856,827 A | 1/1999 | Sudo |
| 5,923,902 A | 7/1999 | Inagaki |
| 6,002,862 A | 12/1999 | Takaike |
| 6,032,202 A | 2/2000 | Lea et al. |
| 6,181,316 B1 | 1/2001 | Little et al. |
| 6,255,961 B1 | 7/2001 | Van et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,587,127 B1 | 7/2003 | Leeke et al. |
| 6,611,537 B1 | 8/2003 | Edens et al. |
| 6,631,410 B1 | 10/2003 | Kowalski et al. |
| 6,728,531 B1 | 4/2004 | Lee et al. |
| 6,732,155 B2 | 5/2004 | Meek |
| 6,757,517 B2 | 6/2004 | Chang |
| 6,778,869 B2 | 8/2004 | Champion |
| 6,826,283 B1 | 11/2004 | Wheeler et al. |
| 6,985,694 B1 | 1/2006 | De Bonet et al. |
| 7,017,118 B1 | 3/2006 | Carroll |
| 7,020,048 B2 | 3/2006 | McComas |
| 7,113,833 B1 | 9/2006 | Brown et al. |
| 7,117,451 B2 | 10/2006 | Sielken |
| 7,130,608 B2 | 10/2006 | Hollstrom et al. |
| 7,130,616 B2 | 10/2006 | Janik |
| 7,143,939 B2 | 12/2006 | Henzerling |
| 7,187,947 B1 | 3/2007 | White et al. |
| 7,236,773 B2 | 6/2007 | Thomas |
| 7,295,548 B2 | 11/2007 | Blank et al. |
| 7,312,785 B2 | 12/2007 | Tsuk et al. |
| 7,358,960 B2 | 4/2008 | Mak |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,742,740 B2 | 6/2010 | Goldberg et al. |
| 7,797,446 B2 | 9/2010 | Heller et al. |
| 7,805,682 B1 | 9/2010 | Lambourne |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,050,652 B2 | 11/2011 | Qureshey et al. |
| 8,074,253 B1 | 12/2011 | Nathan |
| 8,103,009 B2 | 1/2012 | McCarty et al. |
| 8,131,390 B2 | 3/2012 | Braithwaite et al. |
| 8,234,395 B2 | 7/2012 | Millington et al. |
| 8,364,296 B2 | 1/2013 | Wilhelm |
| 8,478,719 B2 | 7/2013 | Savenok et al. |
| 8,483,853 B1 | 7/2013 | Lambourne |
| 9,282,403 B1 | 3/2016 | Torok |
| 9,374,607 B2 | 6/2016 | Bates et al. |
| 9,495,076 B2 | 11/2016 | Kumar et al. |
| 9,798,510 B2 | 10/2017 | Kumar et al. |
| 9,967,296 B2 | 5/2018 | He |
| 2001/0042107 A1 | 11/2001 | Palm |
| 2002/0002039 A1 | 1/2002 | Qureshey et al. |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2002/0165921 A1 | 11/2002 | Sapieyevski |
| 2002/0178191 A1 | 11/2002 | Sielken |
| 2003/0023741 A1 | 1/2003 | Tomassetti et al. |
| 2003/0079038 A1* | 4/2003 | Robbin ................. G06F 1/1613 709/232 |
| 2003/0157951 A1 | 8/2003 | Hasty |
| 2003/0167318 A1 | 9/2003 | Robbin et al. |
| 2003/0198257 A1 | 10/2003 | Sullivan et al. |
| 2003/0210796 A1 | 11/2003 | McCarty et al. |
| 2004/0024478 A1 | 2/2004 | Hans et al. |
| 2004/0025185 A1 | 2/2004 | Goci et al. |
| 2004/0078383 A1 | 4/2004 | Mercer et al. |
| 2004/0078812 A1 | 4/2004 | Calvert |
| 2004/0128198 A1 | 7/2004 | Register et al. |
| 2004/0215611 A1* | 10/2004 | Jawa ................... G06F 17/3002 |
| 2004/0261040 A1 | 12/2004 | Radcliffe et al. |
| 2005/0028225 A1 | 2/2005 | Dawson et al. |
| 2005/0108320 A1 | 5/2005 | Lord et al. |
| 2005/0155072 A1 | 7/2005 | Kaczowka et al. |
| 2005/0166157 A1 | 7/2005 | Ollis et al. |
| 2005/0262253 A1 | 11/2005 | Li et al. |
| 2006/0107237 A1 | 5/2006 | Kim |
| 2006/0168340 A1 | 7/2006 | Heller et al. |
| 2006/0253782 A1 | 11/2006 | Stark et al. |
| 2007/0038999 A1 | 2/2007 | Millington et al. |
| 2007/0142944 A1 | 6/2007 | Goldberg et al. |
| 2007/0288470 A1 | 12/2007 | Kauniskangas et al. |
| 2008/0005690 A1 | 1/2008 | Van Vugt |
| 2008/0016465 A1 | 1/2008 | Foxenland |
| 2008/0104112 A1 | 5/2008 | Nicholl et al. |
| 2008/0134256 A1 | 6/2008 | Dacosta |
| 2009/0228919 A1 | 9/2009 | Zott et al. |
| 2010/0057928 A1 | 3/2010 | Kapoor |
| 2010/0082731 A1 | 4/2010 | Haughay et al. |
| 2010/0131567 A1 | 5/2010 | Dorogusker et al. |
| 2010/0284389 A1 | 11/2010 | Ramsay et al. |
| 2011/0179455 A1 | 7/2011 | Thompson |
| 2011/0264732 A1 | 10/2011 | Robbin et al. |
| 2012/0089910 A1 | 4/2012 | Cassidy |
| 2012/0117026 A1 | 5/2012 | Cassidy |
| 2012/0117586 A1 | 5/2012 | McCoy et al. |
| 2012/0304233 A1 | 11/2012 | Roberts et al. |
| 2013/0174204 A1 | 7/2013 | Coburn, IV et al. |
| 2013/0191749 A1 | 7/2013 | Coburn, IV et al. |
| 2013/0318037 A1* | 11/2013 | Shan .................. G06F 17/30286 707/609 |
| 2013/0343567 A1 | 12/2013 | Triplett et al. |
| 2014/0075308 A1 | 3/2014 | Sanders et al. |
| 2014/0176299 A1 | 6/2014 | Kumar et al. |
| 2014/0181199 A1 | 6/2014 | Kumar et al. |
| 2014/0181654 A1 | 6/2014 | Kumar et al. |
| 2014/0181655 A1 | 6/2014 | Kumar et al. |
| 2014/0181997 A1 | 6/2014 | Kumar et al. |
| 2014/0282882 A1 | 9/2014 | Tsui |
| 2018/0349390 A1 | 12/2018 | Coburn, IV |

FOREIGN PATENT DOCUMENTS

| | | |
|---|---|---|
| WO | 200147248 | 6/2001 |
| WO | 200153994 | 7/2001 |
| WO | 2003093950 A2 | 11/2003 |

OTHER PUBLICATIONS

AudioTron Reference Manual, Version 3.0, May 2002, 70 pages.
AudioTron Setup Guide, Version 3.0, May 2002, 38 pages.

(56) References Cited

OTHER PUBLICATIONS

Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Office Action dated Oct. 4, 2017, issued in connection with EP Application No. 15822747.0, 5 pages.
European Patent Office, Extended European Search Report dated Nov. 23, 2016, issued in connection with European Application No. 15822747.0-1905, 8 pages.
International Bureau, International Preliminary Report on Patentability, dated Jul. 10, 2014, issued in connection with International Application No. PCT/US2012/071212, filed Dec. 21, 2012, 8 pages.
International Searching Authority, International Search Report, dated Nov. 2, 2015, issued in connection with International Application No. PCT/US2015/040348, filed on Jul. 14, 2015, 3 pages.
International Searching Authority, International Search Report dated Sep. 30, 2013, issued in connection with International Patent Application No. PCT/US2013/046383, filed on Jun. 18, 2013, 3 pages.
International Searching Authority, Written Opinion, dated Nov. 2, 2015, issued in connection with International Application No. PCT/US2015/040348, filed on Jul. 14, 2015, 5 pages.
International Searching Authority, Written Opinion dated Sep. 30, 2013, issued in connection with International Patent Application No. PCT/US2013/046383, filed on Jun. 18, 2013, 7 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Mar. 2, 2016, issued in connection with U.S. Appl. No. 14/330,694, filed Jul. 14, 2014, 15 pages.
Non-Final Office Action dated Jun. 21, 2017, issued in connection with U.S. Appl. No. 15/227,148, filed Aug. 3, 2016, 14 pages.
Notice of Allowance dated Jun. 27, 2016, issued in connection with U.S. Appl. No. 14/330,694, filed Jul. 14, 2014, 8 pages.
Notice of Allowance dated Oct. 6, 2017, issued in connection with U.S. Appl. No. 15/227,148, filed Aug. 3, 2016, 5 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
"Welcome. You're watching Apple TV." Apple TV 1st Generation Setup Guide, Apr. 8, 2008 Retrieved Oct. 14, 2014, 40 pages.
"Welcome. You're watching Apple TV." Apple TV 2nd Generation Setup Guide, Mar. 10, 2011 Retrieved Oct. 16, 2014, 36 pages.
"Welcome. You're watching Apple TV." Apple TV 3rd Generation Setup Guide, Mar. 16, 2012 Retrieved Oct. 16, 2014, 36 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
European Patent Office, European Extended Search Report dated Nov. 29, 2018, issued in connection with European Application No. 18203727.5, 9 pages.
Non-Final Office Action dated May 15, 2019, issued in connection with U.S. Appl. No. 16/372,128, filed Apr. 1, 2019, 12 pages.
Notice of Allowance dated Sep. 4, 2019, issued in connection with U.S. Appl. No. 16/372,128, filed Apr. 1, 2019, 8 pages.
European Office Action for corresponding European application No. 18 203 727.5-1209, dated Oct. 31, 2019.

* cited by examiner

RESOLVING INCONSISTENT QUEUES

CROSS REFERENCE TO RELATED APPLICATIONS

This application claims priority under 35 U.S.C. § 120 to, and is a continuation of, U.S. non-provisional patent application Ser. No. 15/227,148, filed on Aug. 3, 2016, entitled "Resolving Inconsistent Queues," which is incorporated herein by reference in its entirety. U.S. non-provisional patent application Ser. No. 15/227,148 claims priority under 35 U.S.C. § 120 to, and is a continuation of, U.S. non-provisional patent application Ser. No. 14/330,694, filed on Jul. 14, 2014, entitled "Inconsistent Queues" and issued as U.S. Pat. No. 9,485,545 on Nov. 1, 2016, which is also incorporated herein by reference in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
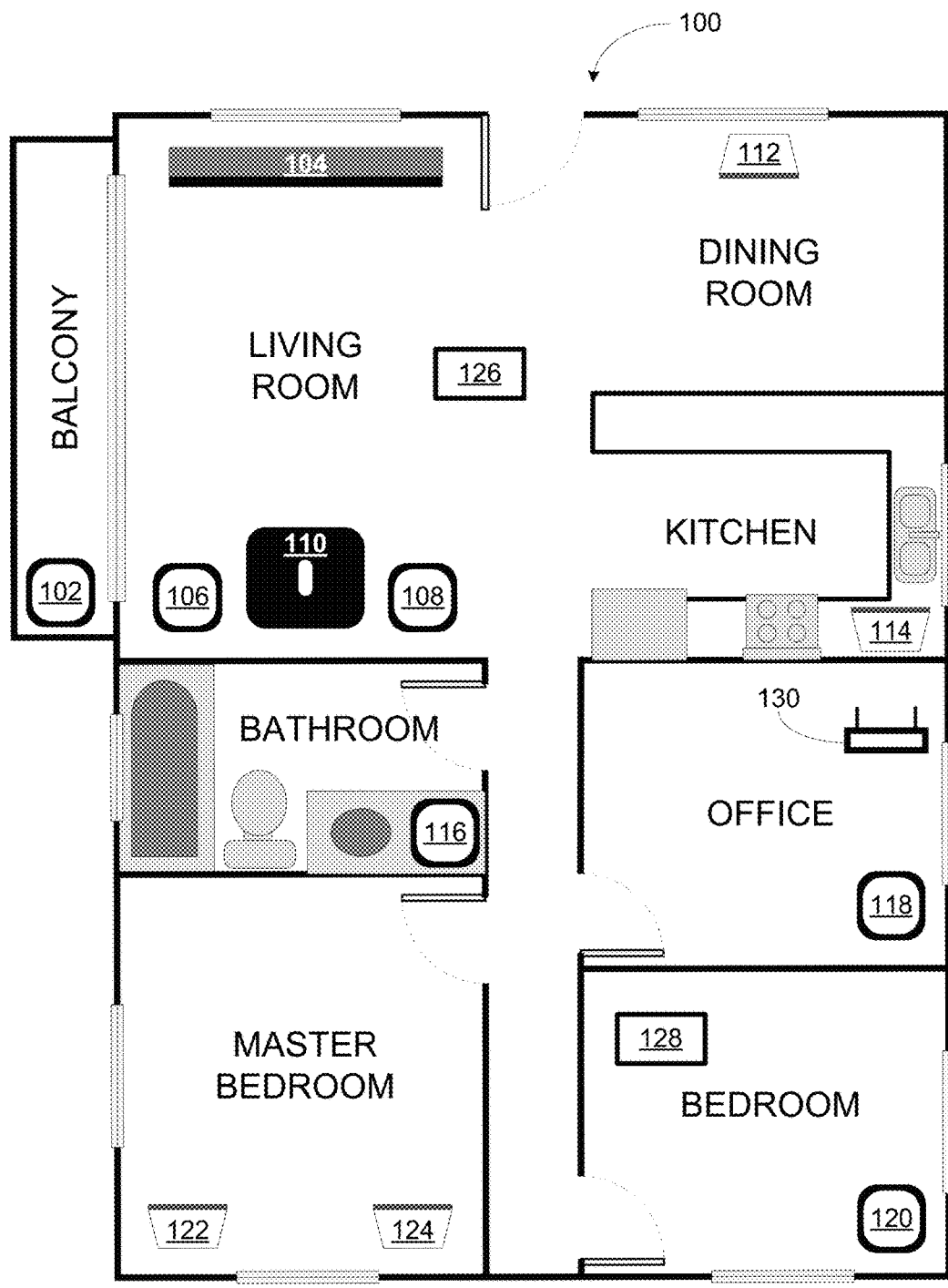
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Embodiments described herein may involve resolving an inconsistent queue on a device of a media playback system. For example, a playback queue associated with a playback device may have a queue that is inconsistent from a playlist that has been added to the queue. More particularly, the playback queue may contain media items that are different than that of a playlist from which the playback queue was originally populated. In some embodiments, one or more playback devices of a media playback system may maintain such a playback queue. The playback queue may indicate ordered media items to be played back by the one or more playback devices of the media playback system, perhaps by two or more playback devices in synchrony.

Various applications on control devices of the media playback system may control the contents of the playback queue on the one or more playback devices, which may be advantageous in some circumstances. For example, an instance of a first control application on a first control device (e.g., a smartphone) may queue first one or more media items of a first playlist in the playback queue. And a second control application on a second control device (e.g., a laptop computer) may queue second one or more media items of a second playlist in the playback queue. Further, another instance of the first control application on a third control device (e.g., a tablet) may queue one or more third media items of a third playlist in the playback queue. Many other examples are possible as well. A queue that is accessible by different control applications may be referred to as a shared queue.

However, in some circumstances, control by various applications may create inconsistencies between playlists on the control devices and the playback queue on the one or more playback devices. For instance, an instance of a first control application on a first control device may queue first one or more media items of a first playlist in the playback queue. A second control application (on a second control device or perhaps on the first control device) may alter the playback queue on the one or more playback devices. For instance, the second control application may queue second one or more media items of a second playlist in the playback queue. Or the second control application may change the order of the first one or more media items of the first playlist within the playback queue. Such an inconsistency may interfere with playback of the first one or more media items of the first playlist by the media playback system, among other possible issues.

In some implementations, a queue may be a private queue that is restricted to a particular control application. Instances of the particular control application may control the contents of the private queue. For instance, a control application may create a private queue at a playback device, queue a playlist at the control device in the private queue, and perhaps alter the private queue. However, instances of other control applications may have a limited capability to control the contents of the private queue or perhaps even to view the contents of the private queue. Such a private queue may permit a greater variety of control applications to operate with media playback systems, as fewer features may be needed for operability. For example, a control application might not necessarily have a feature that permits controlling a shared queue, and instead have a feature that permits controlling a private queue.

A device of the media playback system may resolve an inconsistency between the first playlist and the playback queue. For instance, the first control device may replace any media items in the playback queue with the first one or more media items of the first playlist. Such replacement may involve clearing the playback queue and queuing the first one or more media items of the first playlist in the first playlist. In other implementations, the one or more playback devices may replace the media items in the playback queue with the first one or more media items of the first playlist. Further, in some examples, a device may perform such replacement without interrupting playback at the one or more playback devices.

In another example, the first control application may create a first private queue at the one or more playback devices in which the first playlist is queued. The second control application may then create a second private queue at the one or more playback device in which the second playlist is queued. The second private queue at the one or more playback devices may interfere with the first private queue at the one or more playback devices. The first control application may then replace any media items at the one or more playback devices with the media items in the first playlist.

In some examples, the first control device (or perhaps the one or more playback devices) may determine that the playback queue at the one or more playback devices is inconsistent from the first playlist by way of a queue identification. The queue identification may indicate a version of the playback queue, which may be updated (e.g., incremented) when the playback queue is altered. In operation, the one or more playback devices may maintain the most current queue identification. After alterations to the playback queue, the one or more playback devices may update the queue identification to indicate a new version of the playback queue and notify control applications of the queue identification.

When a control application attempts to alter the playback queue to match a playlist of the control application, the control application may specify the queue identification in addition to the alteration of the playback queue. If the queue identification indicates the current version of the playback queue, the one or more playback devices may allow the specified alteration. However, if the queue identification does not match the current version of the playback queue, the one or more playback devices may indicate to the control application that the queue identification is out-of-date (i.e., stale). Based on such an indication, the control application may then determine that its playlist is inconsistent with the playback queue. Then, based on such a determination, the control application may perform actions to resolve the inconsistency. For instance, the control application may replace all media items in the playback queue with media items in its playlist.

As indicated above, the present application involves inconsistent queues. In one aspect, a method is provided. The method may involve receiving a message indicating a playback queue at a playback device of a media playback system. The playback queue may include first one or more media items queued in a first order for playback at the playback device. Thereafter, the method may also involve detecting that a playlist at the computing device was queued for playback in the playback queue at the playback device. The playlist may include second one or more media items in a second order. Then, the method may further involve determining that the first one or more media items in the first order are different from the second one or more media items in the second order. Based on the determination that the first one or more media items are different from the second one or more media items, the method may involve causing the first one or more media items in the playback queue to be replaced with the second one or more media items in the playlist.

In another aspect, a device is provided. The device may include a network interface, a graphical display, a processor, a data storage, and a program logic stored in the data storage and executable by the processor to perform functions. The functions may include receiving a message indicating a playback queue at a playback device of a media playback system. The playback queue may include first one or more media items queued in a first order for playback at the playback device. Thereafter, the functions may also include detecting that a playlist at the computing device was queued for playback in the playback queue at the playback device. The playlist may include second one or more media items in a second order. Then, the functions may further include determining that the first one or more media items in the first order are different from the second one or more media items in the second order. Based on the determination that the first one or more media items are different from the second one or more media items, the function may include causing the first one or more media items in the playback queue to be replaced with the second one or more media items in the playlist.

In yet another aspect, a non-transitory computer readable memory is provided. The non-transitory computer readable memory has stored thereon instructions executable by a computing device to cause the computing device to perform functions. The functions may include receiving a message indicating a playback queue at a playback device of a media playback system. The playback queue may include first one or more media items queued in a first order for playback at the playback device. Thereafter, the functions may also include detecting that a playlist at the computing device was queued for playback in the playback queue at the playback device. The playlist may include second one or more media items in a second order. Then, the functions may further include determining that the first one or more media items in the first order are different from the second one or more media items in the second order. Based on the determination that the first one or more media items are different from the second one or more media items, the function may include causing the first one or more media items in the playback queue to be replaced with the second one or more media items in the playlist.

In another aspect, a method is provided. The method may involve sending, to a playback device of a media playback system, a queue update message indicating (i) a queue identification that indicates a first version of a playback queue at the playback device, and (ii) a playlist at the computing device. The playlist may indicate first one or more media items in a first order. Thereafter, the method may involve receiving an error message indicating that the queue identification indicated in the queue update message has been superseded by a queue identification that indicates a second version of the playback queue at the playback device. Based on the received error message indicating that the queue identification indicated in the queue update message has been superseded by the queue identification that indicates the second version of the playback queue at the playback device, the method may involve determining that the playlist at the computing device is different from the playback queue of the playback device, where the playback queue indicates second one or more media items in a second order. Based on the determination that that the playlist at the computing device is different from the playback queue of the playback device, the method may involve causing the second one or more media items in the playback queue to be replaced with the first one or more media items in the playlist.

In another aspect, a device is provided. The device may include a network interface, a graphical display, a processor, a data storage, and a program logic stored in the data storage and executable by the processor to perform functions. The functions may include sending, to a playback device of a media playback system, a queue update message indicating (i) a queue identification that indicates a first version of a playback queue at the playback device, and (ii) a playlist at the computing device. The playlist may indicate first one or more media items in a first order. Thereafter, the functions may include receiving an error message indicating that the queue identification indicated in the queue update message has been superseded by a queue identification that indicates a second version of the playback queue at the playback device. Based on the received error message indicating that the queue identification indicated in the queue update message has been superseded by the queue identification that indicates the second version of the playback queue at the playback device, the functions may include determining that the playlist at the computing device is different from the playback queue of the playback device, where the playback queue indicates second one or more media items in a second order. Based on the determination that that the playlist at the computing device is different from the playback queue of the playback device, the functions may include causing the second one or more media items in the playback queue to be replaced with the first one or more media items in the playlist.

In yet another aspect, a non-transitory computer readable memory is provided. The non-transitory computer readable memory has stored thereon instructions executable by a computing device to cause the computing device to perform functions. The functions may include sending, to a playback device of a media playback system, a queue update message indicating (i) a queue identification that indicates a first version of a playback queue at the playback device, and (ii) a playlist at the computing device. The playlist may indicate first one or more media items in a first order. Thereafter, the functions may include receiving an error message indicating that the queue identification indicated in the queue update message has been superseded by a queue identification that indicates a second version of the playback queue at the playback device. Based on the received error message indicating that the queue identification indicated in the queue update message has been superseded by the queue identification that indicates the second version of the playback queue at the playback device, the functions may include determining that the playlist at the computing device is different from the playback queue of the playback device, where the playback queue indicates second one or more media items in a second order. Based on the determination that that the playlist at the computing device is different from the playback queue of the playback device, the functions may include causing the second one or more media items in the playback queue to be replaced with the first one or more media items in the playlist.

In another aspect, another method is provided. The method may involve receiving, by a playback device of a media playback system, a message indicating a playlist at a computing device, where the playlist indicates first one or more media items in a first order. The method may also involve retrieving, by the playback device, a playback queue at the playback device, where the playback queue indicates second one or more media items queued in a second order for playback at the playback device. Thereafter, the method may also involve determining, by the playback device, that the first one or more media items in the first order are different from the second one or more media items in the second order. Based on the determination that the first one or more media items in the first order are different from the second one or more media items in the second order, the method may involve replacing the second one or more media items in the playback queue at the playback device with the first one or more media items in the playlist at the computing device.

In yet another aspect, a playback device is provided. The device may include a network interface, a speaker, a processor, a data storage, and a program logic stored in the data storage and executable by the processor to perform functions. The functions may include receiving a message indicating a playlist at a computing device, where the playlist indicates first one or more media items in a first order. The functions may also include retrieving a playback queue at the playback device, where the playback queue indicates second one or more media items queued in a second order for playback at the playback device. Thereafter, the functions may also include determining that the first one or more media items in the first order are different from the second one or more media items in the second order. Based on the determination that the first one or more media items in the first order are different from the second one or more media items in the second order, the functions may include replacing the second one or more media items in the playback queue at the playback device with the first one or more media items in the playlist at the computing device.

In yet another aspect, a non-transitory computer readable memory is provided. The non-transitory computer readable memory has stored thereon instructions executable by a computing device to cause the computing device to perform functions. The functions may include receiving a message indicating a playlist at a computing device, where the playlist indicates first one or more media items in a first order. The functions may also include retrieving a playback queue at the playback device, where the playback queue indicates second one or more media items queued in a second order for playback at the playback device. Thereafter, the functions may also include determining that the first one or more media items in the first order are different from the second one or more media items in the second order. Based on the determination that the first one or more media items in the first order are different from the second one or more media items in the second order, the functions may include replacing the second one or more media items in the playback queue at the playback device with the first one or more media items in the playlist at the computing device.

It will be understood by one of ordinary skill in the art that this disclosure includes numerous other embodiments. It will be understood by one of ordinary skill in the art that this disclosure includes numerous other embodiments. While some examples described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
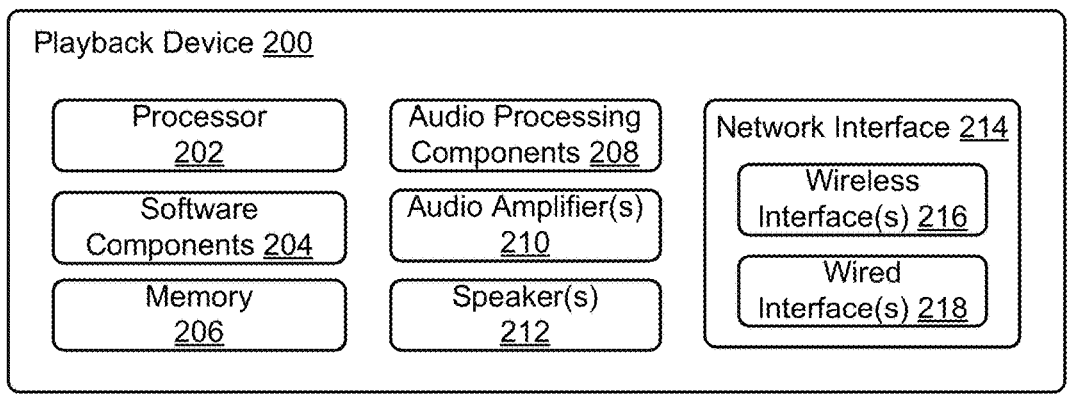
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
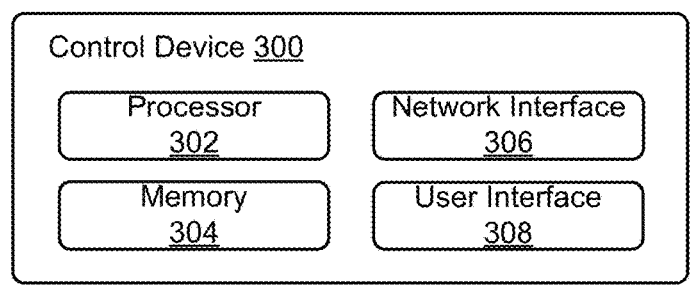
FIG. 3 shows a functional block diagram of an example control device.

FIG. 3 shows a functional block diagram of an example control device 300 (controller) that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
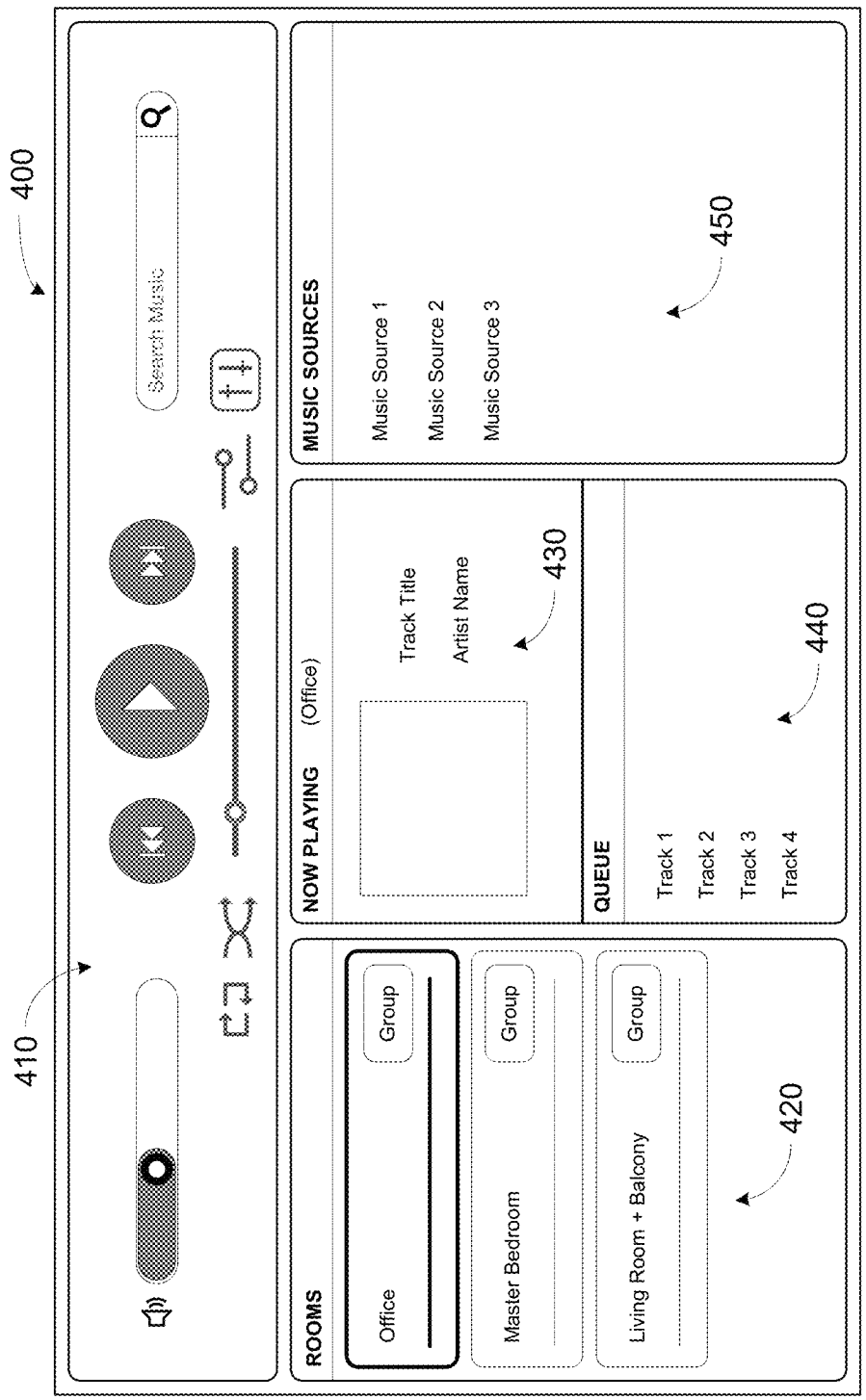
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

e. Example Network For Media Content Playback

Figure 5:
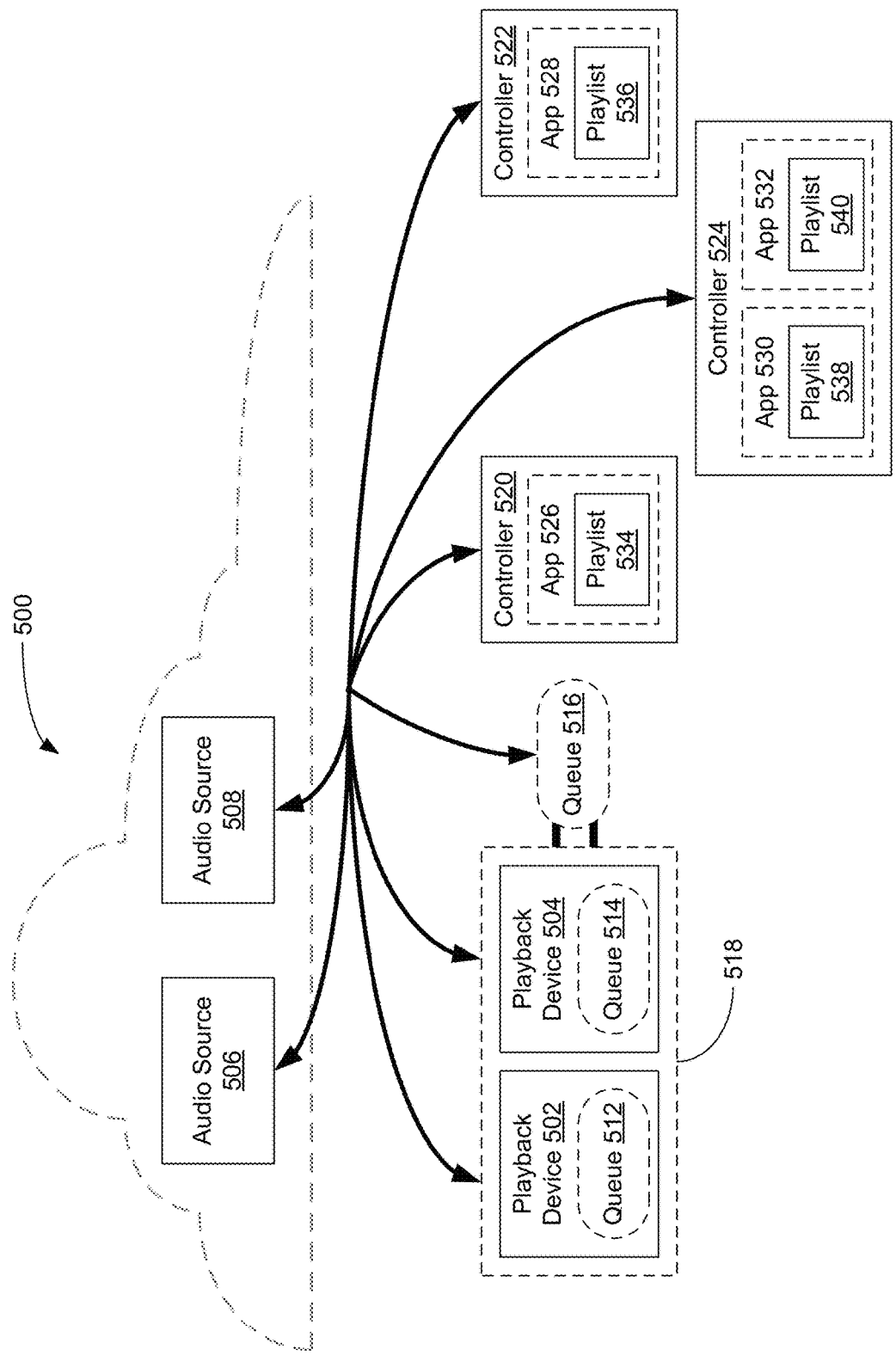
FIG. 5 shows an example network configuration in which certain embodiments may be practiced.

By way of illustration, FIG. 5 shows an example network 500 in which certain embodiments may be practiced. As shown, the example network 500 includes example playback devices 502 and 504, example audio sources 506 and 508, and example controllers 520, 522, and 524.

In an embodiment, the playback devices 502 and 504 may be any of the playback devices shown in FIG. 1 or 2, among other examples. For example, playback devices 502 and 504 may be instances of playback devices 106 and 108 in the Living Room, or instances of playback device 200.

The example audio sources 506 and 508 may be instances any of the example audio content sources noted above, among other examples. In some implementations, the example audio sources 506 and 508 may be fully or partially stored on a cloud network 510, as shown. In other cases, portions of the audio sources 506 and 508 may be stored locally on one or both of the control devices 520, 522, and 524, or on playback device 502 or 504.

Each of the controllers 520, 522, and 524 may be any of the control devices shown in FIG. 1 or 3, among other examples. For example, the controllers 520, 522, and 524 may be instances of controllers 126 and 128, or control device 300, among other examples.

Each of the controllers 520, 522, and 524 may provide control functionality by way of one or more applications (apps) (e.g., program code) executing on a respective processor. For example, controllers 520 and 522 may provide control functionality by way of apps 526 and 528, respectively. Controller 524 may provide control functionality by way of apps 530 and 532, operating either in alternate or concurrently. Apps 526, 528, 530, and 532 may be instances of the same application, or they may be instances of different applications. For example, apps 526 and 530 may be instances of a first application, while app 528 and app 532 may be instances of a second application and a third application respectively. Apps 526, 528, 530, and 532 may have some features in common, and may also have differentiating features.

Apps 526, 528, 530, and 532 may each maintain or have access to one or more playlists. For example, apps 526, 528, 530, and 532 may maintain playlists 534, 536, 538, and 540 respectively. Each of the playlists may be an ordered list of media items playable by a playback device(s), such as playback devices 502 and 504. In one embodiment, playlists 534, 536, 538, and 540 may be respective collections of links or pointers (i.e., URI) to the underlying data for media items that are stored elsewhere, such as the audio sources 506 and 508. In another embodiment, the media items may include pointers to media content stored on a playback device, a control device, or another computing device.

As shown, the example network 500 may also include an example queue 512 associated with the playback device 502, and an example queue 514 associated with the playback device 504. Queue 516 may be associated with a group 518, when in existence, includes playback devices 502 and 504. Queue 516 might be a new queue or a renamed version of queue 502 or 506. Queue 516 may be maintained by playback device 502, playback device 504, or both, among other examples. In some embodiments, in the group 518, the playback devices 502 and 504 would be assigned to queue 516 and queue 512 and 514 would not be available at that time. In some embodiments, when the group is no longer in existence, queue 516 might be unavailable. Each playback device and each combination of playback devices in a network of playback devices, such as those shown in FIG. 1 or that of example playback devices 502, 504, and example combination 518, may be uniquely assigned to a corresponding playback queue.

In some implementations, queues 512, 514, and 516 may be respectively one of two or more types of queues. For instance, queues 512, 514, and 516 may be respectively shared queues or private queues. As noted above, shared queues may be controlled by a variety of control devices and applications. In contrast, private queues may be restricted to instances of a particular control application.

A playback queue, such as playback queues 512, 514, or 516, may include identifications of media items to be played by the corresponding playback device or combination of playback devices. As such, media items added to the playback queue are to be played by the corresponding playback device or combination of playback devices. The playback device may be configured to play media items in the queue according to a specific order (such as an order in which the items were added (e.g., in the order of a playlist)), in a random order, or in some other order.

When a media item is added to the queue via a control device, a link to the item may be added to the queue. In a case of adding a playlist to the queue, links to the media items in the playlist may be provided to the queue. In other cases, a link to the playlist, for example, rather than a link to the media items in the playlist may be provided to the queue, and the playback device or combination of playback devices may play the media items in the playlist by accessing the media items via the playlist.

In some cases, a queue identification may indicate versions of a playback queue at a playback device, perhaps by way of a number or string of characters, or by way of any suitable indication. Each version of the playback queue may represent a particular set of media items in a particular order. Altering the media items in a playback queue or the order of the media items in the queue may result in a new version of the queue identification that indicates the new configuration of the playback queue.

Within examples, after an alteration to a playback queue, the playback device associated with the queue may increment the queue identification to indicate a new version of the playback queue and also notify control devices of the updated queue identification. For instance, after an alteration to playback queue 512, playback device 502 may send an updated queue identification to controllers 520, 522, and 524. The updated queue identification may notify the controllers that the playback queue has changed.

III. Example Methods to Resolve Inconsistent Queues

As discussed above, embodiments described herein may involve inconsistent queues. Some example embodiments may involve resolving inconsistent queues that are inconsistent between a playback device and a control device.

Figure 6:
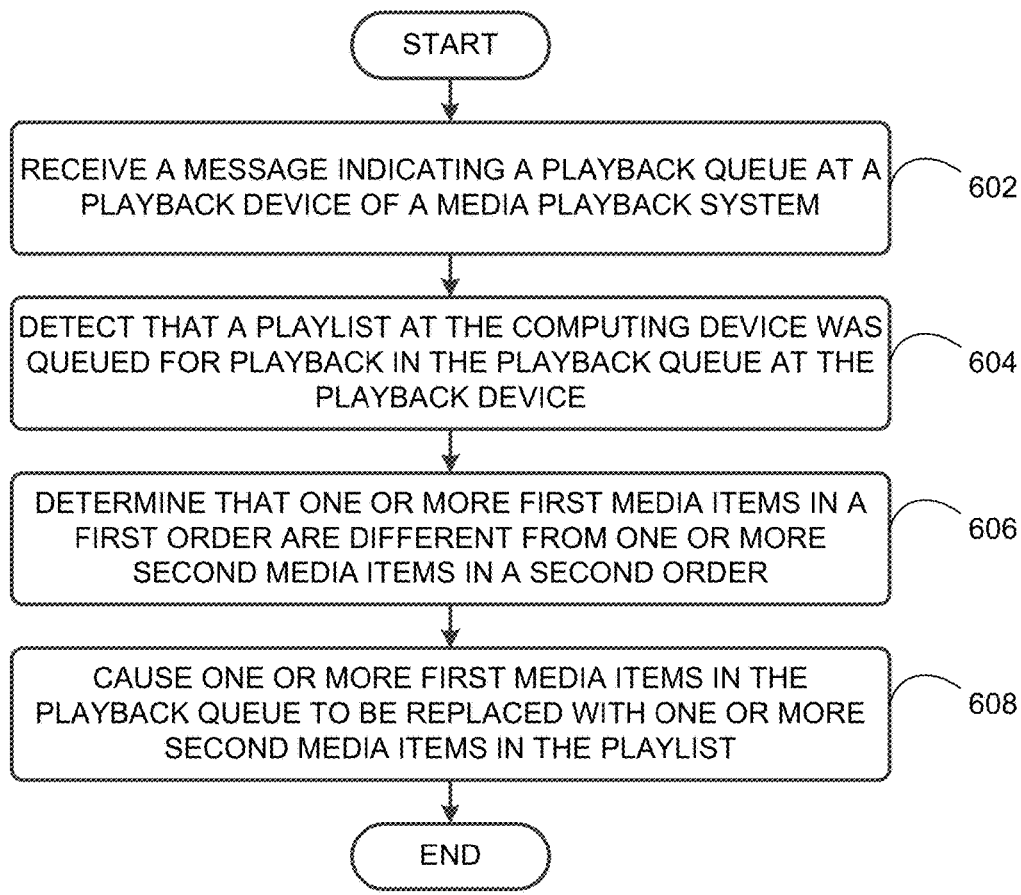
FIG. 6 shows an example flow diagram for resolving an inconsistent queue.
Figure 7:
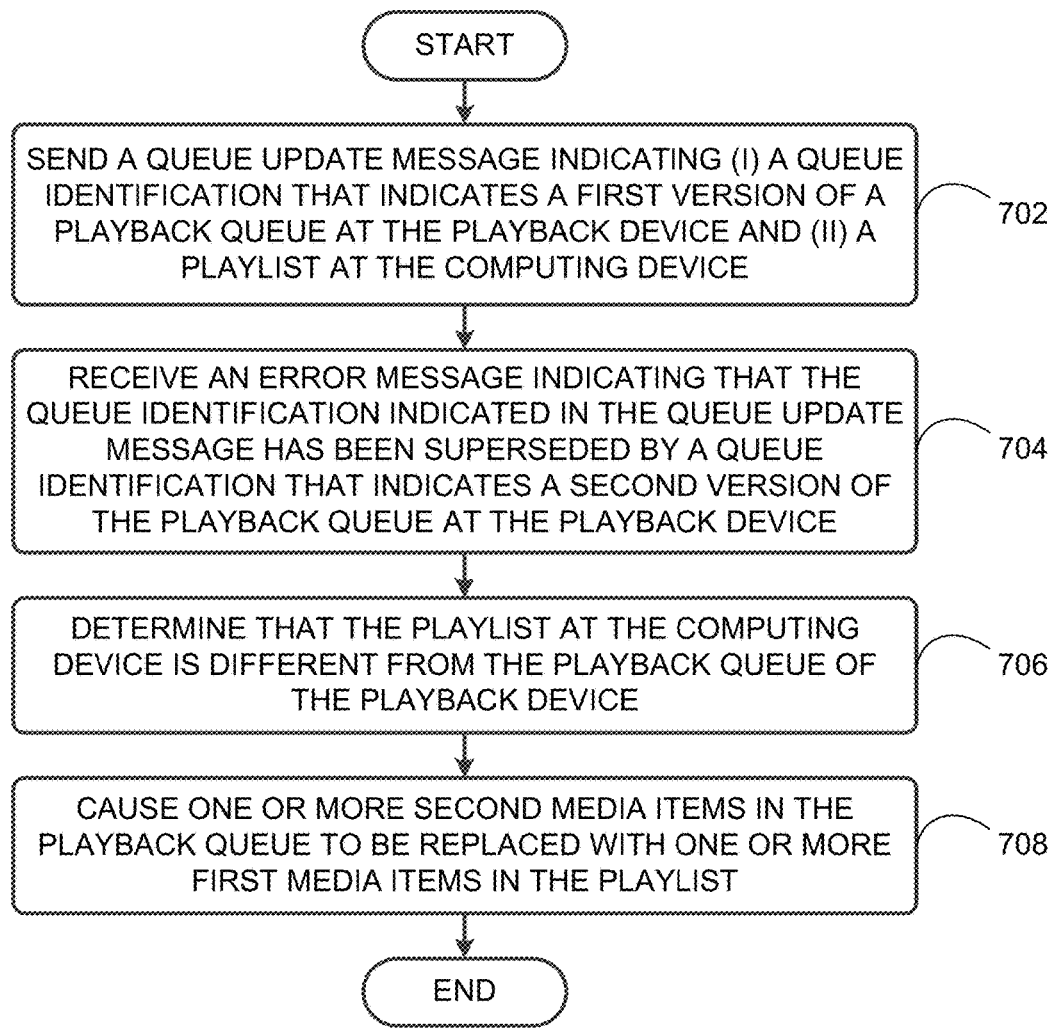
FIG. 7 shows another example flow diagram for resolving an inconsistent queue.

Methods 600 and 700 shown in FIGS. 6 and 7, respectively, present embodiments of methods that can be implemented within an operating environment involving, for example, the media playback system 100 of FIG. 1, one or more of the playback device 200 of FIG. 2, and one or more of the control device 300 of FIG. 3, which may be configured into the example network 500 of FIG. 5. Methods 600 and 700 may include one or more operations, functions, or actions as illustrated by one or more of blocks 602-608 and 702-708, respectively. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the methods 600 and 700 and other processes and methods disclosed herein, the flow chart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the methods 600, 800, and 1000 and other processes and methods disclosed herein, each block in FIGS. 6, 8, and 10 may represent circuitry that is wired to perform the specific logical functions in the process.

a. Example Inconsistent Queue

As noted above, embodiments discussed herein may involve inconsistent queues. An inconsistent queue may involve an inconsistency between a playback queue at a playback device and a playlist at a computing device (e.g., a control device) that has been previously been queued for playback in the playback queue. For example, controller 520 may queue playlist 534 in queue 516. Controller 522 may subsequently queue playlist 536 in queue 516, which may create an inconsistency between queue 516 and playlist 534.

In some cases, the queue inconsistency may be indicated by way of an inconsistency in a queue identification. As noted above, a queue identification may indicate a version of the playback queue. Control devices and playback devices in a media playback system may track the queue identification. For example, playback queue 516 may initially have queue identification '0'. Playback devices 502 and 504, as well as controllers 520, 522, and 524 may track this queue identification.

In operation, controller 520 may request that media items of playlist 534 be queued in playback queue 516. Controller 520 may then update its instance of the queue identification for queue 516 (e.g., from '0' to '1'). Controller 520 may make such request to queue media items based on detecting selection, at a user interface (such as user interface 308), of a playlist (e.g., playlist 534) for playback at playback device 502. In some examples, requests to queue media items of a playlist may involve sending indications (e.g., URIs) of media items in playlist 524. Playback device 502 (or playback device 504) may receive the indications, and subsequently queue the media items of playlist 534 in queue 516.

Alterations to the playback queue may also involve sending the current queue identification (i.e., '0'). In some examples, playback device 502 may require that requests to alter queue 516 indicate the current queue identification (i.e., the current version of the queue). Such a requirement may implement a "first call wins" behavior, in which the first request received by playback device 502 is completed. After queuing the media items of playlist 534 in queue 516, playback device 502 may update its instance of the queue identification from '0' to '1'. Playback device 502 may then deny subsequent requests to alter playback queue 516 which indicate queue identification '0', as such requests are not the "first call." Instead of indicating the current version of queue 516, such requests indicate a previous version of queue 516.

In some cases, after updating the queue identification (e.g., from '0' to '1'), playback device 502 may then send the updated queue identification ('1') to controller 520, which may notify controller 520 that the request to queue media items of playlist 534 was completed. Playback device 502 may also send the updated queue identification ('1') to controllers 522 and 524, which may indicate to controllers 522 and 524 that queue 516 has changed.

After receiving the updated queue identification ('1'), controller 520, 522, or 524 may indicate queue identification '1' in a request to alter queue 516. For instance, controller 522 may indicate queue identification '1' in a request to queue playlist 536 in queue 516. Playback device 502 may then queue media items of playlist 536 in queue 516. This may create an inconsistency between queue 516 and playlist 534, which was previously queued in queue 516.

b. First Example Method to Resolve Inconsistent Queues

Referring now to method 600 in FIG. 6, at block 602, a computing device (e.g., a control device or a playback device) may receive a message indicating a playback queue at a playback device of a media playback system. The playback queue may include first one or more media items queued in a first order for playback at the playback device. For instance, controller 520 may receive a message indicating playback queue 516 at playback device 512, which, continuing the example above, may include media items of playlist 536, and perhaps also media items of playlist 534. Controller 520 may receive the message via a network interface, such as network interface 306 in FIG. 3.

In some examples, the message may indicate the playback queue by way of a queue identification. As noted above, a queue identification may be any indication of a version of the playback queue. Referring back to the example inconsistent queue, after playback device 502 queues media items of playlist 536 in queue 516, playback device 502 may update its queue identification (e.g., from '1' to '2'). Playback device 502 may then send the updated queue identification ('2') to controller 520, 522, and/or 524. Thereafter, for example, controller device 520 may receive the updated queue identification, which may indicate queue 516 at playback device 502. At that point, queue 516 may include one or more media items (e.g., from playlist 536 and/or playlist 534) queued in a particular order.

At block 604, the computing device may detect that a playlist at the computing device was queued for playback in the playback queue at the playback device. For instance, controller 520 may refer to data indicating a status of playlist 534. Such data may indicate that playlist 534 was queued for playback in playback queue 516 at playback device 502. Based on such data, controller 520 may detect that playlist 534 was queued for playback in playback queue 516.

In some cases, the computing device may detect that the playlist at the computing device was queued for playback in the playback queue at the playback device based on input detected by the computing device. For instance, controller 520 may detect input that requests playback of playlist 534 at playback device 502. Such input may resume playback of playlist 534 perhaps after stopping or pausing playback, or perhaps after playing the media items in playlist 534.

At block 606, the computing device may determine that the first one or more media items in the first order are different from the second one or more media items in the second order. For example, controller 520 may determine that queue identification '2' (indicating a version of queue 516 that includes at least the media items of playlist 536) is different from queue identification '1' (indicating a version of queue 516 that includes the media items of playlist 534). Such a determination may indicate to controller 520 that an inconsistency between queue 516 and playlist 534 exists.

Alternatively, the computing device may compare the first one or more media items in the first order (in the playback queue) to the second one or more media items in the second order (in the playlist). For instance, controller 520 may compare the media items in queue 516 to the media items in playlist 534. Based on such a comparison, the computing device may determine that the first one or more media items in the first order are different from the second one or more media items in the second order.

At block 608, based on the determination that the first one or more media items are different from the second one or more media items, the computing device may cause the first one or more media items in the playback queue to be replaced with the second one or more media items in the playlist. Such replacement may resolve the inconsistency between queue 512 and playlist 534.

For example, controller 520 may send, to playback device 502, a request to replace the media items in queue 516 with the media items in playlist 534. Such a request may cause playback device 502 to clear queue 516 of media items (e.g., at least the media items of playlist 536), and then queue the media items of playlist 534 in queue 516.

In some examples, causing the first one or more media items in the playback queue to be replaced may involve allowing a media item to finish playback, such that the replacement does not interrupt playback by the media playback system. For instance, controller 520 (or playback device 502) may determine a media item that is being played by playback device 502 (perhaps in synchrony with playback device 504). Then, before causing the media items in queue 516 to be replaced, the request to replace the media items in queue 516 may allow the determined media item to finish playback before clearing the queue.

In some examples, after causing the first one or more media items in the playback queue to be replaced with the second one or more media items in the playlist, the computing device may update the queue identification. For instance, after replacing the media items, controller 520 may update its instance of the queue identification (e.g., from '2' to '3').

Further, causing the media items to be replaced may also involve causing the updated queue identification to be sent to the playback device and at least one second computing device. For instance, after playback device 502 replaces the media items, it may update its own instance of the queue identification (e.g., from '2' to '3') and then send the updated queue identification to controller 520, controller 522, and/or controller 524.

Further, after causing the first one or more media items in the playback queue at the playback device to be replaced with the second one or more media items in the playlist at the computing device, the computing device may receive an indication that the playback queue at the playback device matches the playlist at the computing device. As noted above, playback device 502 may send the updated queue identification ('3') to controller 520, which may receive the updated queue identification. The updated queue identification may indicate to controller 520 that the queue 516 at playback device 502 matches the playlist 534 at controller 520.

In some cases, before updating the queue identification, the computing device may detect input indicating an alteration of the playlist at the computing device. For instance, controller 520 may detect input at a user interface that modifies the media items in the playlist 534, or perhaps modifying the order of the media items in the media playlist 534. In such a case, the computing device may block or defer the alteration of the playlist until after the queue identification is updated. This may prevent a race condition that may adversely affect updating the queue identification to reflect the actual version of the queue.

At various points during operation, the computing device may detect input indicating an alteration of the playlist at the computing device (e.g., modifying the media items in the queue or modifying the order of the media items in queue). Based on such detected input, the computing device may perform the alteration. The computing device may then send a message (e.g., a request) to the playback device indicating the altered playlist at the computing device, which may cause the playback device to alter the playback queue to reflect the altered playlist. The message may also indicate the last received queue identification, which, as noted above, may indicate to the playback device that the message is a "first call," which may be completed. The computing device may also update its instance of the queue identification.

c. Second Example Method to Resolve Inconsistent Queues

Referring now to method 700 in FIG. 7, at block 702, a computing device may send, to a playback device of a media playback system, a queue update message indicating (i) a queue identification that indicates a first version of a playback queue at the playback device, and (ii) a playlist at the computing device, wherein the playlist indicates first one or more media items in a first order.

Figure 8:
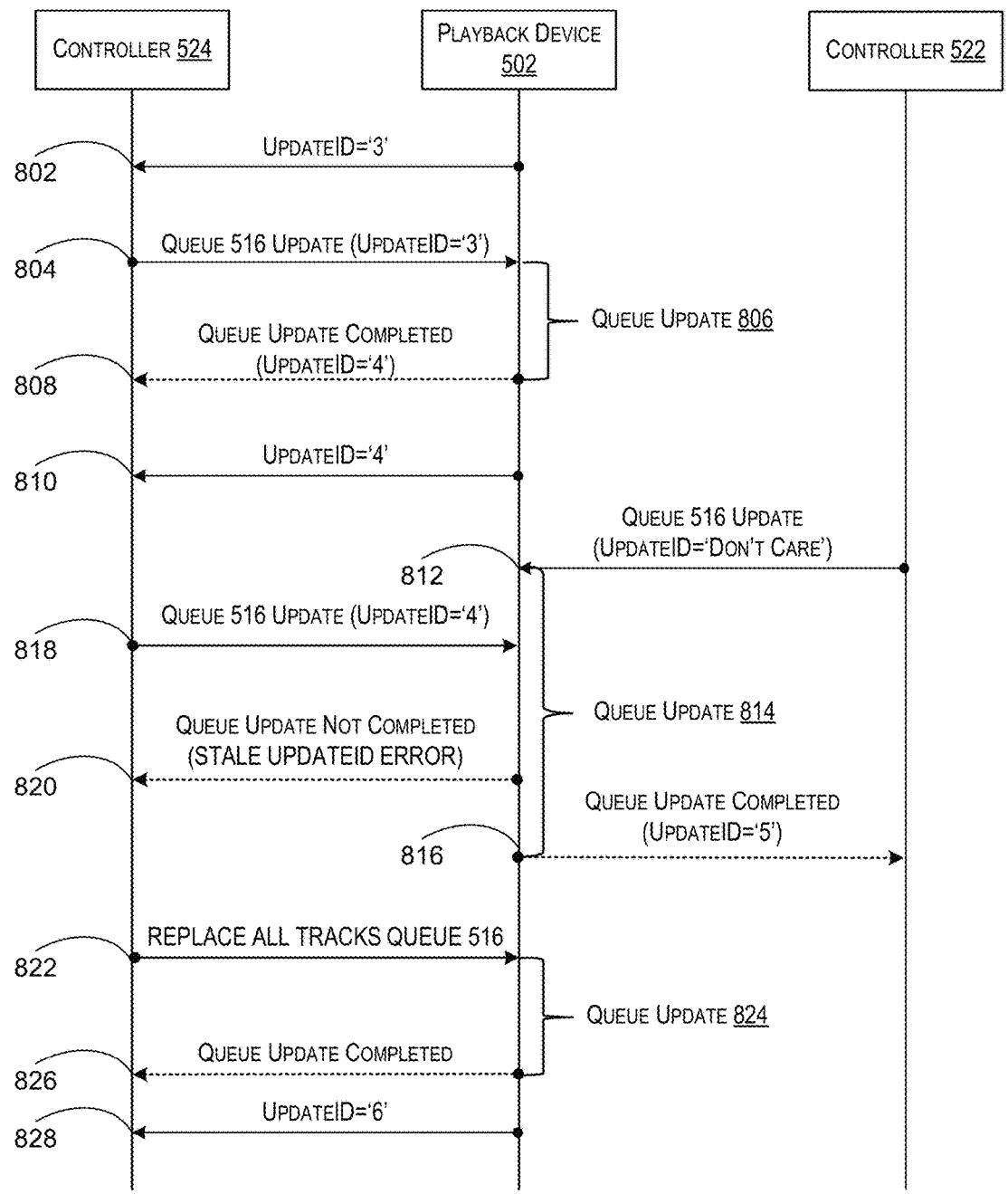
FIG. 8 shows an example timing diagram for resolving an inconsistent queue.

For instance, continuing the previous example, playback device 502 may have sent updated queue identification '3' to controller 524. FIG. 8 is a timing diagram illustrating aspects of method 700. At 802, playback device 524 sends updated queue identification '3' to controller 520.

Then, at 804, playback device 524 requests modification of the queue. More particularly, playback device 524 may send a queue update message to playback device 502. The queue update message may indicate the current queue identification '3', which, as noted above, may indicate a version of the queue 516. The queue update message may also indicate playlist 538 at controller 524, perhaps to cause playback device 502 to queue playlist 538 in the queue 516.

At 806, the queue update message may cause the playback device 502 to queue the media items of playlist 538 in queue 516. Queuing the media items may take a finite amount of time, as shown. The operation of queuing the media items may complete without an error, and the controller 524 and the playback device 502 may update their respective instances of the queue identification to '4'.

After queuing the media items, at 808, the playback device 502 may send an updated queue identification of '4' to controller 524, which may notify controller 524 that the queue update message was received by the playback device 502, and that the playlist 538 was queued in queue 516 (as the queue identification of '4' was the same as expected).

Thereafter, at 812, controller 522 may send a queue update message to playback device 502. The queue update message may cause playback device 502 to queue playlist 536 in queue 516. In some cases, the queue update message may indicate a "don't care" queue identification, perhaps because playlist 536 is maintained at a different application from playlist 538. Based on the "don't care" queue identification at 814, the playback device 502 may queue playlist 536 in queue 516, which may take a finite amount of time, as shown. Such an operation may create an inconsistency between queue 516 and playlist 538. The playback device 502 may also update its instance of the queue identification (e.g., from '4' to '5'). Thereafter, at 820, the operation of updating the playback queue may complete without an error.

At 818 (and during the update of queue 516), the controller 524 may send a second queue update message, which may indicate an alteration to the media items of playlist 538 queued in playlist 516. The controller 524 may send such a queue update message based on detecting input at a user interface that requests an alteration to the playback queue. The queue update message may indicate the queue identification ('4'), which is the latest queue identification received by controller 524 from playback device 502 (i.e., the expected queue identification).

At block 704 in FIG. 7, the computing device may receive an error message indicating that the queue identification indicated in the queue update message has been superseded by a queue identification that indicates a second version of the playback queue at the playback device. For instance, at

820 in FIG. 8, controller 524 may receive a "Stale Update Identification" error message, which may indicate that the version of the queue indicated by queue identification '4' has been superseded by a new version of the queue (i.e., the version of the queue containing at least the media items of playlist 536).

At block 706, based on the received error message indicating that the queue identification indicated in the queue update message has been superseded by the queue identification that indicates the second version of the playback queue at the playback device, the computing device may determine that the playlist at the computing device is different from the playback queue of the playback device. For instance, controller 524 may determine that playlist 538 at controller 524 is different from queue 516 based on the received "Stale Update Identification" error message, as that error message indicates that the instance of the queue identification maintained by controller 524 is different from the instance of the queue identification maintained by playback device 502, which in turn indicates a new version of the queue 516.

At block 708, based on the determination that that the playlist at the computing device is different from the playback queue of the playback device, the computing device may cause the second one or more media items in the playback queue to be replaced with the first one or more media items in the playlist. For example, at 822, controller 524 may send a "Replace All Tracks" request that causes playback device 502 to replace the media items in queue 516 with the media items in playlist 538. Thereafter, at 824, playback device 502 may replace the media items in queue 516 with the media items in playlist 538 and update the update identification to '6' to indicate the new version of the queue. At 826, this operation may complete without an error, and at 828, the playback device 502 may send the updated identification to controller 524.

In some embodiments, after causing the first one or more media items in the playback queue to be replaced with the second one or more media items in the playlist, the computing device may cause the graphical display to display an indication that first one or more media items in the playlist are in the playback queue at the playback device. For instance, controller 524 may display on a user interface an indication that playlist 538 is queued in queue 516.

Although, by way of example, a computing device has been described as performing certain functions in some embodiments, in other embodiments, another device, such as playback device 502 or playback device 504 may perform such functions.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, the present application involves inconsistent queues. In one aspect, a method is provided. The method may involve receiving a message indicating a playback queue at a playback device of a media playback system. The playback queue may include first one or more media items queued in a first order for playback at the playback device. Thereafter, the method may also involve detecting that a playlist at the computing device was queued for playback in the playback queue at the playback device. The playlist may include second one or more media items in a second order. Then, the method may further involve determining that the first one or more media items in the first order are different from the second one or more media items in the second order. Based on the determination that the first one or more media items are different from the second one or more media items, the method may involve causing the first one or more media items in the playback queue to be replaced with the second one or more media items in the playlist.

In another aspect, a device is provided. The device may include a network interface, a graphical display, a processor, a data storage, and a program logic stored in the data storage and executable by the processor to perform functions. The functions may include receiving a message indicating a playback queue at a playback device of a media playback system. The playback queue may include first one or more media items queued in a first order for playback at the playback device. Thereafter, the functions may also include detecting that a playlist at the computing device was queued for playback in the playback queue at the playback device. The playlist may include second one or more media items in a second order. Then, the functions may further include determining that the first one or more media items in the first order are different from the second one or more media items in the second order. Based on the determination that the first one or more media items are different from the second one or more media items, the function may include causing the first one or more media items in the playback queue to be replaced with the second one or more media items in the playlist.

In yet another aspect, a non-transitory computer readable memory is provided. The non-transitory computer readable memory has stored thereon instructions executable by a computing device to cause the computing device to perform functions. The functions may include receiving a message indicating a playback queue at a playback device of a media playback system. The playback queue may include first one or more media items queued in a first order for playback at the playback device. Thereafter, the functions may also include detecting that a playlist at the computing device was queued for playback in the playback queue at the playback device. The playlist may include second one or more media items in a second order. Then, the functions may further include determining that the first one or more media items in the first order are different from the second one or more media items in the second order. Based on the determination that the first one or more media items are different from the second one or more media items, the function may include causing the first one or more media items in the playback queue to be replaced with the second one or more media items in the playlist.

In another aspect, a method is provided. The method may involve sending, to a playback device of a media playback system, a queue update message indicating (i) a queue identification that indicates a first version of a playback queue at the playback device, and (ii) a playlist at the computing device. The playlist may indicate first one or more media items in a first order. Thereafter, the method may involve receiving an error message indicating that the queue identification indicated in the queue update message has been superseded by a queue identification that indicates a second version of the playback queue at the playback device. Based on the received error message indicating that the queue identification indicated in the queue update message has been superseded by the queue identification that indicates the second version of the playback queue at the playback device, the method may involve determining that the playlist at the computing device is different from the playback queue of the playback device, where the playback queue indicates second one or more media items in a second order. Based on the determination that that the playlist at the computing device is different from the playback queue of the playback device, the method may involve causing the second one or more media items in the playback queue to be replaced with the first one or more media items in the playlist.

In another aspect, a device is provided. The device may include a network interface, a graphical display, a processor, a data storage, and a program logic stored in the data storage and executable by the processor to perform functions. The functions may include sending, to a playback device of a media playback system, a queue update message indicating (i) a queue identification that indicates a first version of a playback queue at the playback device, and (ii) a playlist at the computing device. The playlist may indicate first one or more media items in a first order. Thereafter, the functions may include receiving an error message indicating that the queue identification indicated in the queue update message has been superseded by a queue identification that indicates a second version of the playback queue at the playback device. Based on the received error message indicating that the queue identification indicated in the queue update message has been superseded by the queue identification that indicates the second version of the playback queue at the playback device, the functions may include determining that the playlist at the computing device is different from the playback queue of the playback device, where the playback queue indicates second one or more media items in a second order. Based on the determination that that the playlist at the computing device is different from the playback queue of the playback device, the functions may include causing the second one or more media items in the playback queue to be replaced with the first one or more media items in the playlist.

In yet another aspect, a non-transitory computer readable memory is provided. The non-transitory computer readable memory has stored thereon instructions executable by a computing device to cause the computing device to perform functions. The functions may include sending, to a playback device of a media playback system, a queue update message indicating (i) a queue identification that indicates a first version of a playback queue at the playback device, and (ii) a playlist at the computing device. The playlist may indicate first one or more media items in a first order. Thereafter, the functions may include receiving an error message indicating that the queue identification indicated in the queue update message has been superseded by a queue identification that indicates a second version of the playback queue at the playback device. Based on the received error message indicating that the queue identification indicated in the queue update message has been superseded by the queue identification that indicates the second version of the playback queue at the playback device, the functions may include determining that the playlist at the computing device is different from the playback queue of the playback device, where the playback queue indicates second one or more media items in a second order. Based on the determination that that the playlist at the computing device is different from the playback queue of the playback device, the functions may include causing the second one or more media items in the playback queue to be replaced with the first one or more media items in the playlist.

In another aspect, another method is provided. The method may involve receiving, by a playback device of a media playback system, a message indicating a playlist at a computing device, where the playlist indicates first one or more media items in a first order. The method may also involve retrieving, by the playback device, a playback queue at the playback device, where the playback queue indicates second one or more media items queued in a second order for playback at the playback device. Thereafter, the method may also involve determining, by the playback device, that the first one or more media items in the first order are different from the second one or more media items in the second order. Based on the determination that the first one or more media items in the first order are different from the second one or more media items in the second order, the method may involve replacing the second one or more media items in the playback queue at the playback device with the first one or more media items in the playlist at the computing device.

In yet another aspect, a playback device is provided. The device may include a network interface, a speaker, a processor, a data storage, and a program logic stored in the data storage and executable by the processor to perform functions. The functions may include receiving a message indicating a playlist at a computing device, where the playlist indicates first one or more media items in a first order. The functions may also include retrieving a playback queue at the playback device, where the playback queue indicates second one or more media items queued in a second order for playback at the playback device. Thereafter, the functions may also include determining that the first one or more media items in the first order are different from the second one or more media items in the second order. Based on the determination that the first one or more media items in the first order are different from the second one or more media items in the second order, the functions may include replacing the second one or more media items in the playback queue at the playback device with the first one or more media items in the playlist at the computing device.

In yet another aspect, a non-transitory computer readable memory is provided. The non-transitory computer readable memory has stored thereon instructions executable by a computing device to cause the computing device to perform functions. The functions may include receiving a message indicating a playlist at a computing device, where the playlist indicates first one or more media items in a first order. The functions may also include retrieving a playback queue at the playback device, where the playback queue indicates second one or more media items queued in a second order for playback at the playback device. Thereafter, the functions may also include determining that the first one or more media items in the first order are different from the second one or more media items in the second order. Based on the determination that the first one or more media items in the first order are different from the second one or more media items in the second order, the functions may include replacing the second one or more media items in the playback queue at the playback device with the first one or more media items in the playlist at the computing device.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A tangible, non-transitory computer-readable medium having stored therein instructions executable by one or more processors to cause a mobile device to perform a method comprising:
   receiving, on a touch-screen graphical display within a control interface of a first controller application, input data indicating selection of one or more particular audio tracks for playback by one or more particular playback devices;
   transmitting, via a network interface to a computing system, an instruction to create a playback queue that includes the one or more particular audio tracks;
   receiving, via the network interface in response to the instruction to create the playback queue, a first queue update message data indicating a first version number of the playback queue;
   storing, in a queue version state variable indicating the most recent version of the playback queue, the first version number of the playback queue;
   while the first controller application is controlling the playback queue, receiving, via the network interface from the computing system, a second queue update message data indicating a second version number of the playback queue;
   detecting a queue consistency error based on the second version number of the playback queue not matching the first version number of the playback queue stored in the queue version state variable; and
   in response to detecting the queue consistency error, transmitting, via the network interface to the computing system, an instruction to replace all tracks in the playback queue with the one or more particular audio tracks.

2. The tangible, non-transitory computer-readable medium of claim 1, wherein receiving the input data indicating selection of one or more audio tracks for playback by one or more particular playback devices comprises receiving input data indicating selection of a playlist that includes the one or more audio tracks.

3. The tangible, non-transitory computer-readable medium of claim 1, wherein the method further comprises subscribing to queue update messages from the computing system while the first controller application is controlling the playback queue.

4. The tangible, non-transitory computer-readable medium of claim 1, wherein the one or more particular playback devices are playing a particular audio track of the one or more particular audio tracks, and wherein transmitting the instruction to replace all tracks in the playback queue with the one or more particular audio tracks comprises transmitting the instruction to replace all tracks in the playback queue with the one or more particular audio tracks while the one or more particular playback devices continue playing the particular audio track of the one or more particular audio tracks.

5. The tangible, non-transitory computer-readable medium of claim 1, wherein controlling the playback queue comprises:
   displaying, on the touch-screen graphical display within the control interface of the first controller application, (i) a graphical representation of the playback queue and (ii) one or more playback controls to control playback of the playback queue by the one or more particular playback devices.

6. The tangible, non-transitory computer-readable medium of claim 5, wherein the method further comprises:
   receiving, via the control interface on the touch-screen graphical display, input data indicating a command to modify the playback queue;
   transmitting, via the network interface to the computing system, (i) an instruction to modify the playback queue (ii) the first version number of the playback queue stored in the queue version state variable;
   receiving, via the network interface in response to the instruction to create the playback queue, a second queue update message data indicating a third version number of the playback queue; and
   storing, in the queue version state variable indicating the most recent version of the playback queue, the third version number of the playback queue.

7. The tangible, non-transitory computer-readable medium of claim 5, wherein the method further comprises:
   receiving, via the control interface on the touch-screen graphical display, input data indicating a command to modify the playback queue; and
   transmitting, via the network interface to the computing system, (i) an instruction to modify the playback queue (ii) the first version number of the playback queue stored in the queue version state variable, and wherein the mobile device receives the second queue update message data indicating a second version number of the playback queue in response to the instruction to modify the playback queue.

8. A method comprising:
   a mobile device receiving, on a touch-screen graphical display within a control interface of a first controller application, input data indicating selection of one or more particular audio tracks for playback by one or more particular playback devices;
   the mobile device transmitting, via a network interface to a computing system, an instruction to create a playback queue that includes the one or more particular audio tracks;

the mobile device receiving, via the network interface in response to the instruction to create the playback queue, a first queue update message data indicating a first version number of the playback queue;
the mobile device storing, in a queue version state variable indicating the most recent version of the playback queue, the first version number of the playback queue;
while the first controller application is controlling the playback queue, the mobile device receiving, via the network interface from the computing system, a second queue update message data indicating a second version number of the playback queue;
the mobile device detecting a queue consistency error based on the second version number of the playback queue not matching the first version number of the playback queue stored in the queue version state variable; and
in response to detecting the queue consistency error, the mobile device transmitting, via the network interface to the computing system, an instruction to replace all tracks in the playback queue with the one or more particular audio tracks.

9. The method of claim 8, wherein receiving the input data indicating selection of one or more audio tracks for playback by one or more particular playback devices comprises receiving input data indicating selection of a playlist that includes the one or more audio tracks.

10. The method of claim 8, wherein the method further comprises subscribing to queue update messages from the computing system while the first controller application is controlling the playback queue.

11. The method of claim 8, wherein the one or more particular playback devices are playing a particular audio track of the one or more particular audio tracks, and wherein transmitting the instruction to replace all tracks in the playback queue with the one or more particular audio tracks comprises transmitting the instruction to replace all tracks in the playback queue with the one or more particular audio tracks while the one or more particular playback devices continue playing the particular audio track of the one or more particular audio tracks.

12. The method of claim 8, wherein controlling the playback queue comprises:
displaying, on the touch-screen graphical display within the control interface of the first controller application, (i) a graphical representation of the playback queue and (ii) one or more playback controls to control playback of the playback queue by the one or more particular playback devices.

13. The method of claim 12, wherein the method further comprises:
receiving, via the control interface on the touch-screen graphical display, input data indicating a command to modify the playback queue;
transmitting, via the network interface to the computing system, (i) an instruction to modify the playback queue (ii) the first version number of the playback queue stored in the queue version state variable;
receiving, via the network interface in response to the instruction to create the playback queue, a second queue update message data indicating a third version number of the playback queue; and
storing, in the queue version state variable indicating the most recent version of the playback queue, the third version number of the playback queue.

14. The method of claim 12, wherein the method further comprises:
receiving, via the control interface on the touch-screen graphical display, input data indicating a command to modify the playback queue; and
transmitting, via the network interface to the computing system, (i) an instruction to modify the playback queue (ii) the first version number of the playback queue stored in the queue version state variable, and wherein the mobile device receives the second queue update message data indicating a second version number of the playback queue in response to the instruction to modify the playback queue.

15. A mobile device comprising:
a network interface;
a touch-screen graphical display;
one or more processors; and
data storage having stored therein instructions executable by the one or more processors to cause the mobile device to perform a method comprising:
receiving, on the touch-screen graphical display within a control interface of a first controller application, input data indicating selection of one or more particular audio tracks for playback by one or more particular playback devices;
transmitting, via the network interface to a computing system, an instruction to create a playback queue that includes the one or more particular audio tracks;
receiving, via the network interface in response to the instruction to create the playback queue, a first queue update message data indicating a first version number of the playback queue;
storing, in a queue version state variable indicating the most recent version of the playback queue, the first version number of the playback queue;
while the first controller application is controlling the playback queue, receiving, via the network interface from the computing system, a second queue update message data indicating a second version number of the playback queue;
detecting a queue consistency error based on the second version number of the playback queue not matching the first version number of the playback queue stored in the queue version state variable; and
in response to detecting the queue consistency error, transmitting, via the network interface to the computing system, an instruction to replace all tracks in the playback queue with the one or more particular audio tracks.

16. The mobile device of claim 15, wherein receiving the input data indicating selection of one or more audio tracks for playback by one or more particular playback devices comprises receiving input data indicating selection of a playlist that includes the one or more audio tracks.

17. The mobile device of claim 15, wherein the method further comprises subscribing to queue update messages from the computing system while the first controller application is controlling the playback queue.

18. The mobile device of claim 15, wherein the one or more particular playback devices are playing a particular audio track of the one or more particular audio tracks, and wherein transmitting the instruction to replace all tracks in the playback queue with the one or more particular audio tracks comprises transmitting the instruction to replace all tracks in the playback queue with the one or more particular audio tracks while the one or more particular playback devices continue playing the particular audio track of the one or more particular audio tracks.

19. The mobile device of claim 15, wherein controlling the playback queue comprises:
displaying, on the touch-screen graphical display within the control interface of the first controller application, (i) a graphical representation of the playback queue and (ii) one or more playback controls to control playback of the playback queue by the one or more particular playback devices.

20. The mobile device of claim 19, wherein the method further comprises:
receiving, via the control interface on the touch-screen graphical display, input data indicating a command to modify the playback queue; and
transmitting, via the network interface to the computing system, (i) an instruction to modify the playback queue (ii) the first version number of the playback queue stored in the queue version state variable, and wherein the mobile device receives the second queue update message data indicating a second version number of the playback queue in response to the instruction to modify the playback queue.

\* \* \* \* \*